United States Patent [19]
Everhart et al.

[11] 3,964,945
[45] June 22, 1976

[54] METHOD OF MAKING AN ELECTRICAL CABLE

[75] Inventors: William Duke Everhart, Florence, S.C.; Charles Raymond McKay, Severna Park, Md.

[73] Assignee: E. I. Du Pont de Nemours and Company, Wilmington, Del.

[22] Filed: May 9, 1974

[21] Appl. No.: 468,537

Related U.S. Application Data

[60] Continuation of Ser. No. 241,907, April 7, 1972, abandoned, which is a division of Ser. No. 34,812, May 5, 1970, abandoned.

[52] U.S. Cl. ................................. 156/52; 156/56; 156/206; 156/244; 156/306; 174/107; 174/110 PM
[51] Int. Cl.² .................... H01B 7/18; H01B 13/26
[58] Field of Search ............................. 156/51–56, 156/206–207, 244, 306; 264/286, 287; 161/135, 136; 174/105 R, 107, 108, 110 PM, 110 SR, 120 SR, 102 D, 106 D, 36

[56] References Cited
UNITED STATES PATENTS

| | | | |
|---|---|---|---|
| 2,704,106 | 3/1955 | Doyle et al. | 156/183 |
| 2,890,263 | 6/1959 | Brandes et al. | 174/102 D |
| 2,892,007 | 6/1959 | Richards et al. | 174/36 |
| 3,244,799 | 4/1966 | Roberts | 174/107 |
| 3,272,912 | 9/1966 | Jachimowicz | 156/54 |
| 3,286,017 | 11/1966 | Batcher | 156/51 |
| 3,339,007 | 8/1967 | Blodgett | 174/105 R |
| 3,602,633 | 8/1971 | Miller et al. | 174/107 |
| 3,651,244 | 3/1972 | Silver et al. | 174/102 D |
| 3,652,356 | 3/1972 | Van Gasse et al. | 156/206 |
| 3,661,675 | 5/1972 | Frankowski | 156/306 |
| 3,839,137 | 10/1974 | Davis et al. | 174/110 PM |

*Primary Examiner*—Douglas J. Drummond
*Assistant Examiner*—Basil J. Lewris

[57] ABSTRACT

A corrugated plastic article comprising at least two corrugated plastic films each of polyethylene terephthalate held in contact with each other and capable of substantially maintaining its shape under extreme use conditions.

Such corrugated plastic article when heated for 5 minutes at 150°C. has a percent (%) fallout (i.e., the original peak-to-peak height of the corrugations minus the retained peak-to-peak height thereof after heating divided by the original peak-to-peak height) of less than 35%.

In an electrical cable having a conductor core, this corrugated plastic article provides an improved protective member for the core, having good dielectric strength and mechanical strength, electrical stability, low moisture sensitivity and other properties, wherein the corrugations, strength and shape-retention capabilities of the article provide improved cushioning, insulation and other protection for the core.

2 Claims, 4 Drawing Figures

U.S. Patent  June 22, 1976  3,964,945
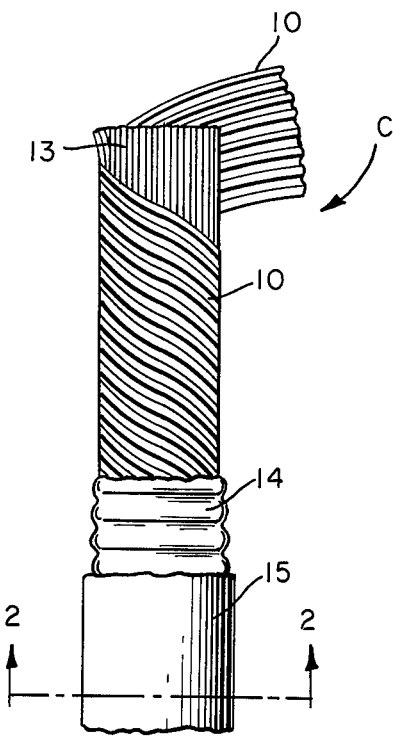
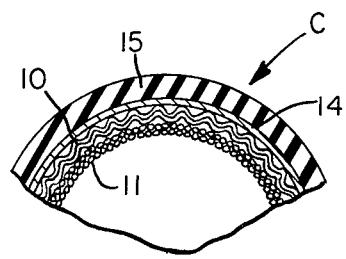
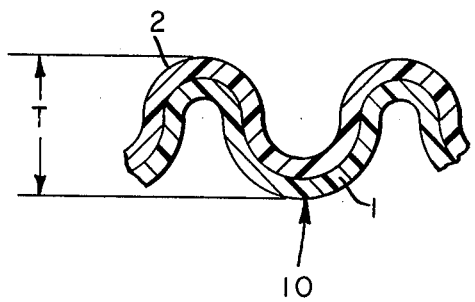
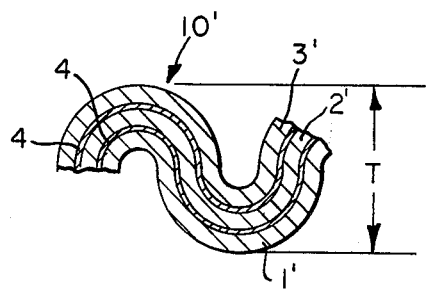
INVENTORS
WILLIAM DUKE EVERHART
CHARLES RAYMOND McKAY
BY Hoge T. Sutherland
ATTORNEY

METHOD OF MAKING AN ELECTRICAL CABLE

This is a continuation of application Ser. No. 241,907, filed Apr. 7, 1972, which application is a division of application Ser. No. 34,812, filed May 5, 1970, both now abandoned.

BACKGROUND OF THE INVENTION

1. Field of the Invention

This invention is a corrugated plastic article and, more particularly, in a prime embodiment, is directed to the use of such article as a protective member for the core of an electrical cable.

2. Description of the Prior Art

The use of plastic film as a protective member in electrical cables is old in the art. The film is wrapped around the outer surface of the core and, thus positioned, provides considerable protection for the core. Polyester film, such as polyethylene terephthalate film, available commercially under the trademark "Mylar", owned by E. I. du Pont de Nemours and Company, is particularly effective in providing various types of protection.

In this connection, the protective member must provide not only electrical and physical separation of the core from an intermediate metallic shell or other elements of the cable in the finished state, but must withstand the rigors and stresses resulting from heat and other factors during use and manufacture of the cable.

In order to meet these multiple requirements, it often has been found necessary or advisable to use various types of and configurations (i.e., corrugated) of protective materials. As an example U.S. Pat. No. 3,244,799 to Roberts shows the use of a single corrugated plastic film as a core protective means or member in a typical illustration of the prior art teachings.

Such corrugated plastic film provides a low-cost thermal barrier for the core while additionally providing the familiar excellent abrasion resistance, puncture resistance, high melting point, chemical resistance and dielectric strength properties of such film. Through the use of this corrugated plastic film, the excellent balance of properties continues to aid cable manufacturers in lowering reject rates and manufacturing costs while maintaining high reliability in the finished cable.

Many corrugated protective members of this type, however, tend to "wilt" under high heat use or manufacturing conditions, thus causing the protective member to lose its required corrugated shape and to function in a less desirable manner, particularly as a cushioning device and as insulation, due to the diminished height (measured from corrugation peaks) of the protective member.

In known cable wrapping applications, the film used is relatively thin (2 to 3 mils thick prior to corrugating, for example) and is corrugated under heat and pressure in the lengthwise or machine direction of the film to a corrugated thickness of around 9.5 mils. This thin single layer of film is not always suitable for insulation in extreme, high-heat situations as it lacks the required dielectric strength and mechanical strength and shape-retention capabilities in this particular use situation. One purpose of the corrugations of the protective member is to provide as much air space as possible to improve thermal insulation. To do so requires that the protective member retain its basic shape. This shape-retention capability of applicants' corrugated, multiple layer protective member is the keystone of this invention.

It has been found that the corrugations of the protective member, if of proper height and shape, provide effective and critical air spaces in the area between the core and the intermediate shield and outer covering or jacket of the cable. These air spaces provide pneumatic cushioning against mechanical forces which might otherwise damage the core and protection also is afforded by the resilient nature of the corrugations themselves. Inasmuch as the plastic material is substantially non-absorbent, damage by moisture which might change the electrical properties of the windings is avoided.

The following, then, are among the basic property requirements sought in a protective member or wrap for the core of an electrical cable: (1) resists chemical attack, (2) good dielectric strength, (3) electrical stability, (4) good insulating properties, (6) rigidity, (7) good mechanical strength, (8) good shape retention capabilities, and (9) good cushioning properties.

The corrugated plastic protective member or article of this invention, by retaining its essential shape, even under extreme conditions, provides improved cushioning and strength and further provides improved thermal insulation and dielectric strength in meeting the above-named requirements.

It is evident, of course, that the corrugated plastic article of this invention has other uses than as protective material or member in cables. Its novel shape-retention properties give it wide utility, as readily will be understood, and this invention includes that utility.

SUMMARY OF THE INVENTION

This invention, in a preferred embodiment, is a protective member for the core of an electrical cable.

Briefly described, such protective member is a corrugated material of at least two suitable plastic films, such as polyester films, having good insulating and cushioning properties and other desired characteristics. The electrical cables are of the type which include a conductor core formed of a plurality of individually insulated conductor wires, and the composite core is encased in this novel protective member.

In conventional electrical cables of this type, various protective barriers or members have been employed in efforts to fulfill several different requirements which are necessary both during the manufacture of the cable in the manufacturing plant, and in the end use applications of the cable in the field. For example, one of these requirements is mechanical protection whereby the protective member will resist punctures by foreign materials and by the edges or slivers from metallic coverings which are usually applied over the protective member. It is important that the protective member provide adequate cushioning so that the insulation on the conductors of the core is not crushed by irregularities in the metallic shield at the time of its application or in subsequent use, as cables of this type are frequently reeled and unreeled several times during their lifetime.

Another critical requirement is the provision of thermal insulation, particularly against damage during the application of the thermoplastic jacket or covering which is usually applied over the metallic shield. These thermoplastic coverings are applied in a molten state at temperatures sufficiently high to cause the insulation on the core conductors to suffer damage from the heat unless the protective member can retard the temperature rise in the core until the temperature of the covering can be lowered to within a safe range.

It is also important that the protective covering or core wrap possess the required dielectric strength in separating the conductors in the cable core from the metallic shield. In the use of these cables in the field, the metallic shield is usually held at ground potential, and during periods of over-potential on the conductors in the cable core (usually caused by lightning), the protective member serves to prevent a dielectric failure of the insulation on the cable conductors and grounding of the conductors which would result in their inoperativeness.

Electrical stability is also an important feature, as the protective covering material for the core must have original electrical properties which will not adversely affect the electrical properties of the cable core. A low dielectric constant, low dissipation factor, and high dielectric strength are desirable. Furthermore, the material must retain these properties during its operating life in the field. For example, a material which would absorb moisture and thereby change its electrical properties is extremely undesirable.

Lastly, for example, during the application of the outer jacket or jackets in a cable, the heat resulting from the molten application can cause harmful "fallout" of the protective members and lessen the usefulness of the member unless such fallout is diminished. This is of great importance in the electrical protection arts.

The present invention solves these and other problems existent in the prior art by using at least two similar plastic films, held together, as a protective device or member for the core in an electrical cable. Such protective member is surface-contoured or corrugated, and retains its essential shape, thereby to provide these multiple required characteristics or properties in a novel composite material.

BRIEF DESCRIPTION OF THE DRAWING

FIG. 1 is a view of an electrical cable, with parts omitted for clarity, showing a corrugated plastic protective member of this invention positioned around a core to protect it and between the core and a metallic shield and an outer covering of the cable;

FIG. 2 is an enlarged fragmentary, cross-sectional view of the cable taken along line 2—2 of FIG. 1;

FIG. 3 is a fragmentary view of the novel article or protective member of this invention, this being the preferred embodiment; and FIG. 4 is a view of a modified article or protective member of the invention.

DESCRIPTION OF THE PREFERRED EMBODIMENTS

Referring to the drawing and FIGS. 1 and 2 in particular, there is shown an electrical cable C having a corrugated protective member 10 of at least two plastic films 1 and 2 positioned in a manner to protect a core 13 of the cable during manufacture and during use applications, as further will be explained.

The core 13, which is composed of a plurality of individually insulated conductor wires, is wrapped with the corrugated protective member 10. Over this member 10 is placed a metallic shield 14, preferably also corrugated, which surrounds the protective member 10 and this, in turn, is covered with an insulating jacket or covering 15 which, as previously stated, is usually applied in molten state.

In the cable C shown, the protective member 10 is spirally wound upon the core 13; it may also be applied longitudinally, for example, to the periphery of the core with its longitudinal edges in overlapping relation, not shown. In both instances, the corrugations of the protective member or core wrap 10 completely envelop the core 13, which, together with the characteristics of the plastic material employed for the core wrap 10, provide the essential mechanical protection, thermal insulation, dielectric protection and electrical stability and other protection in the cable C.

FIG. 2 best illustrates the relationship of the plastic, dual layer, protective member 10 with respect to the core 13 and the metallic shield 14. It will be seen that the corrugations of the protective member 10 completely surround the periphery of the core 13, providing the critical air spaces for insulation and the like and, at the same time, affording the desired cushioning effect for mechanical protection.

FIG. 3 shows the preferred core protective member 10 of this invention consisting of the two plastic films 1 and 2 held together to form the composite member 10. This member or article 10, it is, of course, understood is usable in many areas or situations other than as a core wrap or protective member. The combined thickness of the plastic films, prior to corrugating, is less than 5 mils.

FIG. 4 shows a modification of a multiple layer member or article, designated 10', of this invention. It consists of first, second and third layers 1', 2' and 3' of plastic film bonded together at their interfaces with an adhesive 4.

More than three layers may be used and the bonding may be with or without adhesives, and the layer may be of different thicknesses.

It is important to note that the layers of the composites or articles 10 and 10' may be laminated together by heat and pressure without using an adhesive; may be bonded together using an adhesive or flame treating one or more surfaces; or, may be held together by the blocking characteristics of the films and, still, in each of these instances provide a novel, useful and inventive article of manufacture.

Further, preferably, in the laminating or bonding operations the superposed layers of film are "spot" bonded or spot laminated together, leaving small multiple air spaces between the layers, thereby further enhancing its insulating properties. By laminating or bonding the layers together on a corrugator, it is a simple matter to bring about this spot or "area" type of joining due to the heat and periodic pressure intermittently placed on the layers during the corrugating operation.

The cross-sectional profiles of the corrugations of the protective member 10 may be either triangular, square, trapezoidal, semi-circular, or sinusoidal, or various combinations of these shapes.

Suitable usuable films for the members or articles 10 or 10' are biaxially oriented heat-set films of polyethylene terephthalate with properties similar to those described in Canadian Patent No. 599,248 to Fuller and in U.S. Pat. No. 2,935,859 to Marvin.

Briefly, then, the invention comprises the use of a multiple layer corrugated protective member 10 or 10' of suitable plastic film, such as polyester film, of high dielectric strength and having improved shape-retaining properties, as a barrier between the periphery of the cable core 13 and the adjacent or other cable parts.

It has also been found, for example, that the corrugations of the protective member 10 provide effective air spaces in the area between the cable core 13 and the surrounding metallic sheild 14. In addition, these air spaces provide insulation against heat transfer from the metallic shield 14 to the conductor insulation during the cable jacketing operation, in accordance with known heat insulating techniques, and these same air spaces provide pneumatic cushioning against mechanical forces applied to the cable core 13 which might otherwise damage the conductor insulation. Also, protection is afforded by the resilient deflection of the corrugations themselves under the load applied to the tape. Furthermore, dielectric strength between the conductors of the core 13 and the metallic shield 14 is improved by the elimination of damaged conductor insulation. Inasmuch as this all-plastic protective member is completely nonabsorbent, damage by moisture which might change the electrical properties of the cable is avoided.

From this, it will be apparent that the protective members 10 and 10', to function properly, should retain their basic shape during all use situations.

For example, the volume of the air spaces defined by the corrugations, the cushioning provided by the corrugations and other functions depend on the retention of the essential shape of the corrugated member. For instance, in a cable use application, it has been found that the fallout of the protective member should be sufficiently limited or controlled so that the height of the protective member, as measured from corrugation crest to corrugation crest, is at least eight mils after the outer jacket or jackets 15 have been applied.

In the electrical arts, therefore, it is seen that among the important functional properties sought in core insulation material are the following:
1. A high mechanical strength.
2. A reasonable retention of mechanical and electrical properties at elevated temperatures and after relatively long periods of heat aging.
3. A high degree of chemical inertness toward electrical insulating varnishes.
4. A low degree of moisture sensitivity.
5. A moderately high dielectric fatigue and dielectric strength.

Polyethylene terephthalate film is outstanding as a dielectric because it possesses the unique combination of properties listed above. The use of this film provides for highly desirable improvements in electrical cable performance and design.

Further, the thickness T nd shape of the members 10 or 10' of this invention, during the manufacture of the cable C and during the use of such cable, is critical to the invention. Generally, the thickness T of the member 10 should remain substantially the same during both of these periods, as has been explained. In other words, the fallout of these members 10 and 10' must be sufficiently limited as to assure that the shape and size of such members is such as to enable them to perform satisfactorily in cable manufacturing and use operations. In this connection, as will be seen, a fallout of less than 35% is highly sought after and to be desired.

Various comparisons involving the effectiveness and performance of the multiple layer polyethylene terephthalate core protective member of this invention with other protective members of polyethylene terephthalate under certain conditions may be made by referring to the following tables and discussion:

Table I

| | | Original Peak-to-Peak Height Before Heating | Fallout* | % Fallout** |
|---|---|---|---|---|
| Multiple (Double) Layer Member | Avg. | 9.0 | 6.48 | 28.0* |
| | Range | 8.3 – 11.0 | 5.50 – 7.60 | |
| Single Layer Member | Avg. | 9.7 | 4.82 | 50.4 |
| | Range | 8.5 – 10.6 | 4.10 – 5.40 | |
| (Units measured in mils) | | | | |

*Retained peak-to-peak height, after heating, in 150°C. oven for five minutes.

**% Fallout (thermal stability) = $\frac{\text{Original peak-to-peak height minus retained peak height after heating}}{\text{Original peak-to-peak height}}$ It will be seen that the multiple (double) layer member shows a 45% improvement in fallout or thermal stability over the single layer member in this test. Data are based on one hundred rolls each of these materials.

In another test, 10 samples of double layer polyethylene terephthalate material and ten samples of triple layer polyethylene terephthalate material were corrugated, tested, then separated and peak-to-peak height and fallout were determined as follows:

Table II

| | Peak-to-Peak Height | | |
|---|---|---|---|
| | Before Heating | After Heating | % Fallout |
| Double Layer Member | 9.28 | 7.26 | 21.7 |
| Separated-Sh. 1 | 7.86 | 3.40 | 56.7 |
| Sh. 2 | 7.96 | 4.04 | 49.2 |
| Triple Layer Member | 9.81 | 8.66 | 11.7 |
| Separated-Sh. 1 | 7.01 | 3.03 | 56.8 |
| Sh. 2 | 7.09 | 3.35 | 52.8 |
| Sh. 3 | 7.13 | 3.05 | 57.2 |

Again, it is seen that the multiple (double and triple) layer members of composites exhibit a dramatic improvement in fallout (thermal stability) over the single layer members separated therefrom.

Additionally, double layer polyethylene terephthalate corrugated samples or members were measured (in mils) for peak-to-peak height, separated, and peak-to-peak height measured, pressed back together, heated, and the fallout test run. The layers were separated again and measured, then pressed back together and remeasured. The data are shown in Table III.

Two single polyethylene terephthalate layers of corrugated members were measured for peak-to-peak height, pressed together, the fallout test run, the sheets separated for single layer fallout determination, then pressed back together and remeasured. These data are shown in Table IV.

Table III

| | Double Layer Member (Peak-to-Peak Height) | Double Layer Member, Corrugated Together, Separated | | | | | | | |
|---|---|---|---|---|---|---|---|---|---|
| | | Separate Layers | Pressed Back | After Five Min. At 150°C. | % Fallout | Separate Layers | % Fallout | Pressed Back | % Fallout |
| Control | 9.28 | — | — | 7.08 | 23.7 | — | — | — | — |
| Sample 1 | 9.16 | 7.87–7.76 | 9.18 | 6.43 | 29.8 | 3.76–3.25 | 52.2–58.1 | 6.28 | 31 |
| Sample 2 | 9.17 | 7.80–7.90 | 9.18 | 6.13 | 33.2 | 3.22–3.87 | 58.7–51.0 | 6.01 | 34 |
| Average | 9.17 | 7.84–7.83 | 9.18 | 6.28 | 31.5 | 3.49–3.56 | 55.5–54.6 | 6.15 | 33 |

Table IV

| | Single Layer Member, Corrugated Separately, and Pressed Together | | | | | | | | |
|---|---|---|---|---|---|---|---|---|---|
| Control | — | 8.14 | — | 3.10 | 61.9 | — | — | — | — |
| Sample 1 | — | 8.39–8.18 | 9.98 | 5.07 | 54.1 | 3.32–3.10 | 60.4–62.1 | 5.04 | 49 |
| Sample 2 | — | 8.33–8.16 | 9.90 | 4.91 | 50.4 | 3.19–2.99 | 61.7–63.4 | 4.89 | 50 |
| Average | — | 8.36–8.17 | 9.94 | 4.99 | 52.3 | 3.26–3.09 | 61.0–62.8 | 4.97 | 50 |

From these data, it can be observed that the double layer corrugated members show improved thermal stability over two layers pressed together.

In another test, separate layers of polyethylene terephthalate material were laminated together using various laminating media, the combined layers corrugated, and fallout tests run to compare the two-layer member and the single-layer member. The results are shown in Table V.

Table V

| | Laminations | | |
|---|---|---|---|
| | Peak-to-Peak | After Five Min. at 150°C. | % Fallout |
| Control | 8.46 | 5.90 | 30.2 |
| Heat Seal | 8.35 | 5.58 | 33.2 |
| Two-Side PS Tape | 11.36 | 8.43 | 25.8 |
| Polyester Adhesive (R/W*) | 8.77 | 7.15 | 18.4 ⎫ 21.6 |
| Polyester Adhesive (Corr.)** | 10.00 | 7.53 | 24.8 ⎭ |
| Rubber Adhesive (R/W | 7.94 | 5.92 | 24.7 ⎫ 28.0 |
| Rubber Adhesive (Corr.) | 9.33 | 6.41 | 31.3 ⎭ |
| (Unit of measure is mils) | | | |

*(R/W) — Adhesive applied at rewinder.
**(Corr.) — Adhesive applied at corrugator.

It is seen, then, that an article of manufacture consisting of the type described and of at least two layers of plastic material, held together by various means, has many improved properties over single layer plastic material; thus producing an article of great utility in many use applications, including electrical cables.

We claim:

1. A method of making an electrical cable having a core and a shield including the steps of:

forming a corrugated protective member by corrugating at least two polyethylene terephthalate films together under heat and pressure whereby such films are laminated together and wherein the combined thickness of the films, prior to corrugating, is less than 5 mils;

positioning such protective member between the core and the shield, with such protective member completely surrounding the periphery of such core, and applying an outer jacket in a molten state over the shield, such core being effectively insulated from heat thereof by the protective member during such application and wherein the protective member has a percent fall-out of less than 35% when heated for 5 minutes at 150°C. and wherein the height of the protective member, in the finished cable and after the outer jacket has been applied, as measured from corrugation crest to corrugation crest, is at least 8 mils.

2. The method of claim 1 wherein the films are bonded together with an adhesive prior to corrugating.

* * * * *